United States Patent
Bejleri et al.

(10) Patent No.: US 10,724,402 B2
(45) Date of Patent: Jul. 28, 2020

(54) GAS TURBINE DUCT LINER COUPLING ASSEMBLY

(71) Applicant: United Technologies Corporation, Farmington, CT (US)

(72) Inventors: Rigels Bejleri, Southington, CT (US); Patrick M. Devaney, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 313 days.

(21) Appl. No.: 15/633,109

(22) Filed: Jun. 26, 2017

(65) Prior Publication Data

US 2018/0371946 A1    Dec. 27, 2018

(51) Int. Cl.
*F01D 25/24*    (2006.01)
*F02K 1/80*    (2006.01)
*F02K 1/82*    (2006.01)
*F02C 3/04*    (2006.01)
(Continued)

(52) U.S. Cl.
CPC .......... *F01D 25/24* (2013.01); *F01D 25/243* (2013.01); *F02C 3/04* (2013.01); *F02K 1/80* (2013.01); *F02K 1/82* (2013.01); *F01D 11/005* (2013.01); *F04D 29/522* (2013.01); *F05D 2220/32* (2013.01); *F05D 2230/60* (2013.01); *F05D 2230/642* (2013.01); *F05D 2240/14* (2013.01); *F05D 2260/30* (2013.01); *F05D 2260/31* (2013.01); *F05D 2260/36* (2013.01); *F05D 2300/171* (2013.01); *F05D 2300/603* (2013.01)

(58) Field of Classification Search
CPC ... F02C 7/20; F02K 1/805; F02K 1/80; F02K 1/82; F05D 2240/90; F05D 2260/30; F05D 2260/31; F23R 3/60; F01D 25/24; F01D 25/243; F01D 25/28; F01D 25/30; B64D 29/00; B64D 29/06
See application file for complete search history.

(56) References Cited

U.S. PATENT DOCUMENTS 9,441,501 B2 * 9/2016 Ballard, Jr. ............. F01D 25/26
9,638,133 B2   5/2017 Kramer
(Continued)

FOREIGN PATENT DOCUMENTS

EP    1277919 A1    1/2003

OTHER PUBLICATIONS

European Search Report for Application No. 18169352.4; dated Feb. 4, 2019.

*Primary Examiner* — Craig Kim
(74) *Attorney, Agent, or Firm* — Cantor Colburn LLP

(57) ABSTRACT

A duct liner assembly for a gas turbine engine includes a first ring and a second ring. Also included is a first duct liner having a first end and a second end, the first duct liner mounted proximate the first end of the first duct liner to the first ring. Further included is a second duct liner having a first end and a second end, the second duct liner mounted proximate the second end of the second duct liner to the second ring. Yet further included is a coupling assembly including a threaded insert, a retaining bracket, and a threaded fastener extending through the retaining bracket and in threaded engagement with the threaded insert to couple the retaining bracket to the second duct liner.

20 Claims, 3 Drawing Sheets

(51) Int. Cl.
 *F01D 11/00* (2006.01)
 *F04D 29/52* (2006.01)

(56) References Cited

U.S. PATENT DOCUMENTS

| | | | |
|---|---|---|---|
| 2003/0014964 A1* | 1/2003 | Sathianathan | F01D 21/045 60/226.1 |
| 2011/0150374 A1* | 6/2011 | Mitsch | F01D 25/28 384/37 |
| 2011/0252808 A1* | 10/2011 | McKenney | F01D 25/164 60/796 |
| 2014/0102108 A1 | 4/2014 | Kramer | |
| 2015/0354412 A1* | 12/2015 | Preston | F01D 25/28 60/796 |
| 2016/0003094 A1 | 1/2016 | Renggli et al. | |
| 2016/0348590 A1 | 12/2016 | Porter et al. | |

\* cited by examiner

GAS TURBINE DUCT LINER COUPLING ASSEMBLY

FEDERAL RESEARCH STATEMENT

This invention was made with Government support under contract number FA8626-16-C-2139 awarded by the United States Air Force. The Government has certain rights in the invention.

BACKGROUND

Exemplary embodiments pertain to the art of gas turbine engines and, more particularly, to a duct liner coupling assembly for gas turbine engines.

Gas turbine engines include airstreams that are at least partially defined by duct liners. In some cases, the duct lining is split for various reasons. Securing the split duct liners to each other may be challenging, particularly if thermal growth of the coupled components must be accounted for. For example, coupled duct liners may need to accommodate axial growth, but radially constrain one component relative to the other component. The assembly sequence may dictate the order in which the components must be loaded onto each other. However, if there isn't enough axial space to slide one component onto another component within a component utilized for radial constraint, assembly may be further complicated, particularly if assembling stiff, conical, cylindrical or partially conical duct liners, as typically done in gas turbine engine applications.

BRIEF DESCRIPTION

Disclosed is a duct liner assembly for a gas turbine engine that includes a first ring and a second ring. Also included is a first duct liner having a first end and a second end, the first duct liner mounted proximate the first end of the first duct liner to the first ring. Further included is a second duct liner having a first end and a second end, the second duct liner mounted proximate the second end of the second duct liner to the second ring. Yet further included is a coupling assembly including a threaded insert operatively coupled to a wall defining an aperture through one of the first duct liner and the second duct liner. The coupling assembly also includes a retaining bracket having a mating segment and a retaining segment, wherein a hole extends through the mating segment, the second end of the first duct liner disposed between the retaining segment and the second duct liner. The coupling assembly further includes a threaded fastener extending through the hole of the retaining bracket and in threaded engagement with the threaded insert to couple the retaining bracket to the second duct liner.

In addition to one or more of the features described above, or as an alternative, further embodiments may include a bushing operatively coupled to the threaded insert and disposed within the aperture and coupled to the wall.

In addition to one or more of the features described above, or as an alternative, further embodiments may include that at least a portion of the bushing is disposed between the threaded insert and the wall.

In addition to one or more of the features described above, or as an alternative, further embodiments may include that the threaded insert is heat staked to the bushing.

In addition to one or more of the features described above, or as an alternative, further embodiments may include that the bushing is metal.

In addition to one or more of the features described above, or as an alternative, further embodiments may include that the bushing is riveted to the wall.

In addition to one or more of the features described above, or as an alternative, further embodiments may include that the retaining bracket is a single, integrally formed component.

In addition to one or more of the features described above, or as an alternative, further embodiments may include that the retaining bracket comprises a plurality of components operatively coupled to each other.

In addition to one or more of the features described above, or as an alternative, further embodiments may include that the coupling assembly allows relative axial deflection between the first and second duct liners and constrains relative radial deflection between the first and second duct liners.

In addition to one or more of the features described above, or as an alternative, further embodiments may include that the threaded insert is stainless steel.

In addition to one or more of the features described above, or as an alternative, further embodiments may include that the second duct liner includes an organic matrix composite (OMC).

Also disclosed is a gas turbine engine including a compressor section, a combustor section and a turbine section. Also included is a duct liner assembly surrounding at least one of the compressor section and the turbine section. The duct liner assembly includes a first duct liner. The duct liner assembly also includes a second duct liner. The duct liner assembly further includes a coupling assembly operatively coupling the first duct liner to the second duct liner to allow relative axial deflection between the first and second duct liners and constrain relative radial deflection between the first and second duct liners, the coupling assembly comprising a retaining bracket having a mating segment and a retaining segment, the first duct liner disposed between the retaining segment and the second duct liner, the mating segment operatively coupled to the second duct liner.

In addition to one or more of the features described above, or as an alternative, further embodiments may include that the coupling assembly further comprises a threaded insert operatively coupled to a wall defining an aperture through one of the first duct liner and the second duct liner. The coupling assembly also includes a threaded fastener extending through a hole defined by the mating segment of the retaining bracket and in threaded engagement with the threaded insert to couple the retaining bracket to the second duct liner.

In addition to one or more of the features described above, or as an alternative, further embodiments may include a bushing operatively coupled to the threaded insert and disposed within the aperture and coupled to the wall.

In addition to one or more of the features described above, or as an alternative, further embodiments may include that the threaded insert is heat staked to the bushing.

In addition to one or more of the features described above, or as an alternative, further embodiments may include that the bushing is metal.

In addition to one or more of the features described above, or as an alternative, further embodiments may include that the threaded insert is stainless steel.

In addition to one or more of the features described above, or as an alternative, further embodiments may include that the second duct liner includes an organic matrix composite (OMC).

In addition to one or more of the features described above, or as an alternative, further embodiments may include that the gas turbine engine includes a first airstream path and a second airstream path, each of the airstream paths being annular and radially spaced from each other.

Further disclosed is a method of assembling a duct liner assembly for a gas turbine engine. The method includes operatively coupling a first duct liner to a first ring. The method also includes placing an end of a second duct liner on a radially outer surface of the first duct liner. The method further includes coupling a retaining bracket to the first duct liner after the second duct liner has been placed on the first duct liner, a portion of the retaining bracket axially overlapping with the end of the second duct liner and being radially outward of the second duct liner to constrain radial movement of the second duct liner and allow axial movement of the second duct liner.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
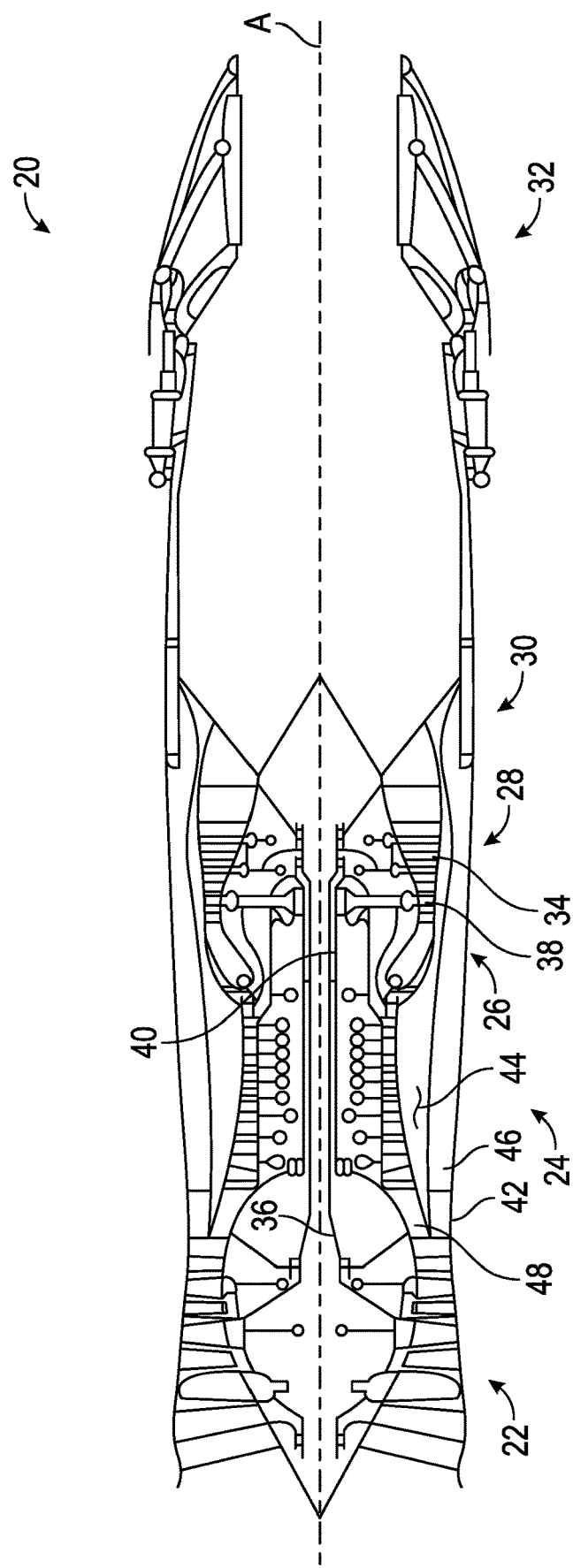
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmenter section 30 and a nozzle section 32. The sections are defined along a central longitudinal engine axis A. Although depicted as an augmented low bypass gas turbine engine in the disclosed non-limiting embodiment, it should be understood that the concepts described herein are applicable to other gas turbine engines including geared or non-geared high bypass architecture engines, direct drive turbofans, turboshaft engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine may define the outer engine case structure 42 and the inner engine structure 44 which essentially define an exoskeleton to support the core engine therein.

Air which enters the fan section 22 is divided between a core flow through the core flow path 48 and a secondary flow through the secondary flow path 46. The core flow passes through the combustor section 26, the turbine section 28, then the augmentor section 30 where fuel may be selectively injected and burned to generate additional thrust through the nozzle section 32. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 42 and the inner engine structure 44 then may be at least partially injected into the core flow adjacent the nozzle section 32.

The outer engine case structure 42 and the inner engine structure 44 as well as other engine structures are often manufactured of Ceramic Matrix Composite, Organic Matrix Composite materials and combinations thereof which are moisture sensitive. The Ceramic Matrix Composite and the Organic Matrix Composite materials will hereinafter be referred to herein as composite materials but it should be understood that any such moisture sensitive materials and structured are also contemplated.

Figure 2:
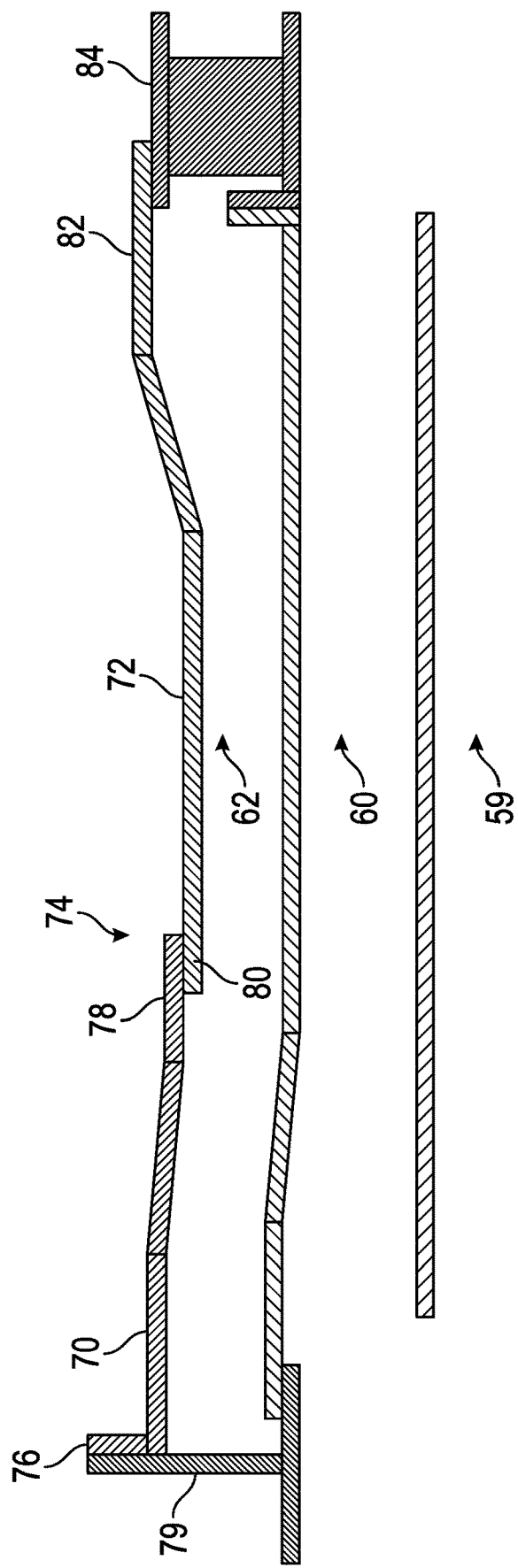
FIG. 2 is a side, partial cross-sectional view of a duct liner coupling assembly of the gas turbine engine.
Figure 3:
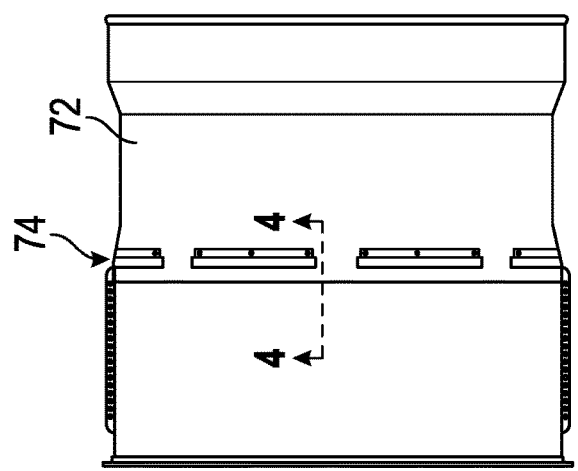
FIG. 3 is a side, elevational view of the duct liner coupling assembly according to another aspect of the disclosure.

Referring now to FIGS. 2 and 3, a portion of the gas turbine engine 20 is illustrated in greater detail. In some embodiments, the portion of the gas turbine engine 20 is the augmentor section 30. In particular, multiple airstream paths, and the structural components defining the paths, are illustrated. In some embodiments, three airstream paths are provided, such as a first airstream path 59 and a second airstream path 60. Regardless of the number of airstream paths, the paths are typically annular paths radially spaced from each other that route fluid along an axial direction of the engine 20. Various structural components, which are also referred to herein as liners, ducts, duct liners or the like, define the airstream paths. As such, it is to be understood that these terms may be used interchangeably for purposes herein. The outer liner components include a first duct liner 70 and a second duct liner 72. In some embodiments, the first duct liner 70 may be referred to as a rear outer augmentor duct (ROAD) and the second duct liner 72 may be referred to as a nozzle duct. The duct liners 70, 72 may be formed of various contemplated materials. In some embodiments, the first duct liner 70 is formed of a metal, such as titanium. In some embodiments, the second duct liner 72 is formed of a composite material, such as an organic matrix composite (OMC).

The first duct liner 70 and the second duct liner 72 are coupled at an interface region 74, as described in detail herein. The interface region 74 must allow axial growth (i.e., relative axial motion), but constrain relative radial deflections. This is complicated by the assembly sequence that is typically required, specifically installation of the first duct liner 70 after installation of the second duct liner 72. The coupling techniques described herein accommodate the necessary assembly sequence, while meeting the desired relative motion demands.

As shown in FIG. 2, the first duct liner 70 includes a first axial end 76 and a second axial end 78. The first duct liner 70 is operatively coupled to a first ring 79 proximate the first axial end 76. The first ring 79 may be referred to as a mount ring. The second duct liner 72 also includes a first axial end 80 and a second axial end 82. The second duct liner 72 is operatively coupled to a second ring 84 proximate the second axial end 82. In some embodiments, the second ring 84 is referred to as a ring-strut-ring. The interface region 74 is located proximate an overlapping region proximate the second axial end 78 of the first duct liner 70 and the first axial end 80 of the second duct liner 72.

Figure 4:
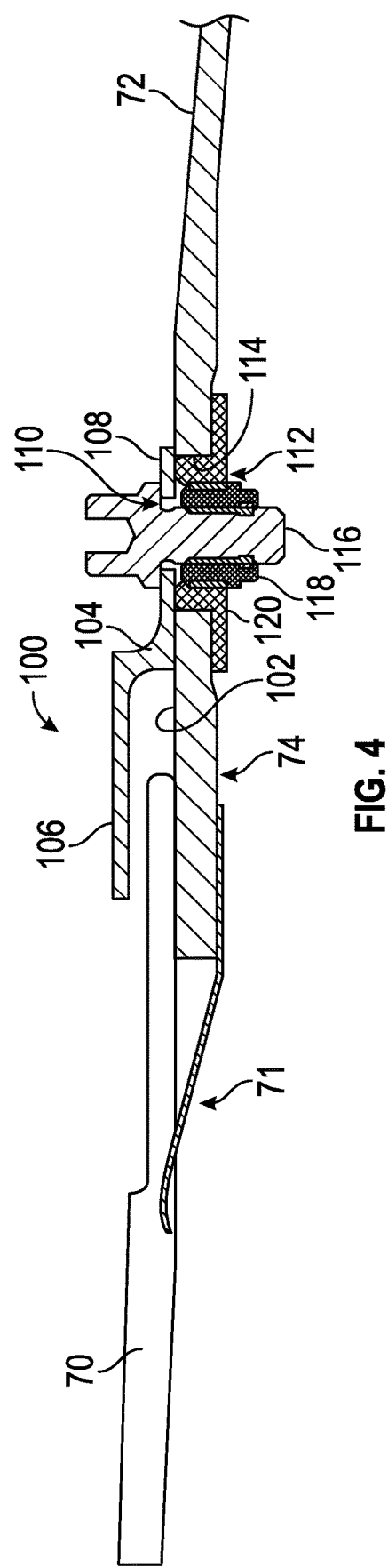
FIG. 4 is a cross-sectional view of the duct liner coupling assembly taken along line 4-4 of FIG. 3.

Referring now to FIG. 4, the interface region 74 is illustrated in greater detail. As noted above, the first duct liner 70 must be installed subsequent to installation of the second duct liner 72, but the axial space available proves such installation of the conical, cylindrical or partially conical, component challenging. A coupling assembly 100 is provided to assist with the installation process. In particular, after the second duct liner 72 is installed (e.g., operatively coupled to the second ring 84), the first duct liner 70 may simply be placed in an overlapping manner with an outer surface 102 of the second duct liner 72. The coupling assembly 100 then provides the above-described required axial growth allowance and the radial deflection constraint.

Although a single coupling assembly 100 is described herein, it is to be understood that some embodiments include a plurality of circumferentially spaced coupling assemblies, as shown in FIG. 3.

The coupling assembly 100 includes a retaining bracket 104 having a retaining segment 106 and a mating segment 108. The retaining bracket 104 may be formed as a single, integrally formed component or assembled with multiple portions. During assembly, the second axial end 78 of the first duct liner 70 is placed on the outer surface 102 of the first axial end 80 and the retaining segment 106 of the retaining bracket 104 is then placed over (i.e., radially outward of) the second axial end 78 of the first duct liner 70. This disposes a portion of the first duct liner 70 between the second duct liner 72 and the retaining segment 106. The geometry of the retaining bracket 104 sandwiches the first duct liner 70 between the retaining segment 106 and the outer surface 102 of the second duct liner 72, effectively constraining radial deflection of the first duct liner 70 relative to the second duct liner 72.

The mating segment 108 of the retaining bracket 104 is coupled to the second duct liner 72. In the illustrated embodiment, the mating segment 108 defines a hole 110 that is aligned with an aperture 112 defined by a wall 114 of the second duct liner 72. Upon alignment, a threaded fastener 116 is inserted through the hole 110 and the aperture 112 for threaded engagement with a threaded insert 118 that is operatively coupled to the wall 114 of the second duct liner 72. In some embodiments, the threaded insert 118 is formed with stainless steel. In embodiments where the second duct liner 72 is formed of OMC, it may not be desirable or practical to directly couple the threaded insert 118 to the wall 114. In such embodiments, a bushing 120 is disposed therebetween to facilitate coupling. The bushing 120 is metal in some embodiments. For example, the bushing 120 may be formed of titanium. The threaded insert 118 may be heat staked to the bushing 120 and the bushing 120 may be riveted to the wall 114. Although specific joining processes are described herein by way of example, it is to be appreciated that other techniques may be employed.

As shown in FIG. 4 sealing may be achieved with a finger seal 71 in some embodiments, but it is to be appreciated that other sealing structures are contemplated. Furthermore, sealing may not be required in some embodiments.

The embodiments described herein provide a lightweight solution to the assembly sequence issues described above, while constraining radial deflection and allowing axial growth.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A duct liner assembly for a gas turbine engine comprising:
    a first ring;
    a second ring;
    a first duct liner having a first end and a second end, the first duct liner mounted proximate the first end of the first duct liner to the first ring; a second duct liner having a first end and a second end, the second duct liner mounted proximate the second end of the second duct liner to the second ring; and a coupling assembly comprising:
    a threaded insert operatively coupled to a wall defining an aperture through one of the first duct liner and the second duct liner;
    a retaining bracket disposed radially outboard of the second duct liner having a mating segment and a retaining segment, wherein a hole extends through the mating segment, the second end of the first duct liner disposed radially between the retaining segment and the second duct liner; and
    a threaded fastener extending radially through the hole of the retaining bracket and in threaded engagement with the threaded insert to couple the retaining bracket to the second duct liner;
    wherein the coupling assembly is configured to allow for axial movement of the second end of the first duct liner relative to the second duct liner.

2. The duct liner assembly of claim 1, further comprising a bushing operatively coupled to the threaded insert and disposed within the aperture and coupled to the wall.

3. The duct liner assembly of claim 2, wherein at least a portion of the bushing is disposed between the threaded insert and the wall.

4. The duct liner assembly of claim 2, wherein the threaded insert is heat staked to the bushing.

5. The duct liner assembly of claim 2, wherein the bushing is metal.

6. The duct liner assembly of claim 2, wherein the bushing is riveted to the wall.

7. The duct liner assembly of claim 1, wherein the retaining bracket is a single, integrally formed component.

8. The duct liner assembly of claim 1, wherein the retaining bracket comprises a plurality of components operatively coupled to each other.

9. The duct liner assembly of claim 1, wherein the coupling assembly allows axial movement of the first duct liner relative to the second duct liner and constrains radial deflection the first duct liner relative to the second duct liner.

10. The duct liner assembly of claim 1, wherein the threaded insert is stainless steel.

11. The duct liner assembly of claim 1, wherein the second duct liner includes an organic matrix composite (OMC).

12. A gas turbine engine comprising:
- a compressor section;
- a combustor section;
- a turbine section; and
- a duct liner assembly surrounding at least one of the compressor section and the turbine section, the duct liner assembly comprising:
  - a first duct liner;
  - a second duct liner; and
  - a coupling assembly operatively coupling the first duct liner to the second duct liner configured to allow axial movement of the first duct liner relative to the second duct liner and constrain radial deflection the first duct liner relative to the second duct liner, the coupling assembly comprising a retaining bracket disposed radially outboard of the second duct liner having a mating segment and a retaining segment, the first duct liner disposed radially between the retaining segment and the second duct liner, the mating segment operatively coupled to the second duct liner.

13. The gas turbine engine of claim 12, wherein the coupling assembly further comprises:
- a threaded insert operatively coupled to a wall defining an aperture through one of the first duct liner and the second duct liner; and
- a threaded fastener extending through a hole defined by the mating segment of the retaining bracket and in threaded engagement with the threaded insert to couple the retaining bracket to the second duct liner.

14. The gas turbine engine of claim 13, further comprising a bushing operatively coupled to the threaded insert and disposed within the aperture and coupled to the wall.

15. The gas turbine engine of claim 14, wherein the threaded insert is heat staked to the bushing.

16. The gas turbine engine of claim 14, wherein the bushing is metal.

17. The gas turbine engine of claim 13, wherein the threaded insert is stainless steel.

18. The gas turbine engine of claim 12, wherein the second duct liner includes an organic matrix composite (OMC).

19. The gas turbine engine of claim 12, wherein the gas turbine engine includes a first airstream path and a second airstream, each of the airstream paths being annular and radially spaced from each other.

20. A method of assembling a duct liner assembly for a gas turbine engine comprising:
- operatively coupling a first duct liner to a first ring;
- placing an end of a second duct liner on a radially outer surface of the first duct liner; and
- coupling a retaining bracket to a radial outer surface of the first duct liner after the second duct liner has been placed on the first duct liner, a portion of the retaining bracket axially overlapping with the end of the second duct liner and being radially outward of the second duct liner, the coupling configured to constrain radial movement of the second duct liner and allow axial movement of the second duct liner;
- wherein the second duct liner is disposed radially between the first duct liner and the portion of the retaining bracket.

\* \* \* \* \*